Dec. 10, 1968   R. C. LUGIEWICZ   3,414,936
METHODS AND APPARATUS FOR PROCESSING MEAT OR THE LIKE
Filed Feb. 10, 1966   2 Sheets-Sheet 2
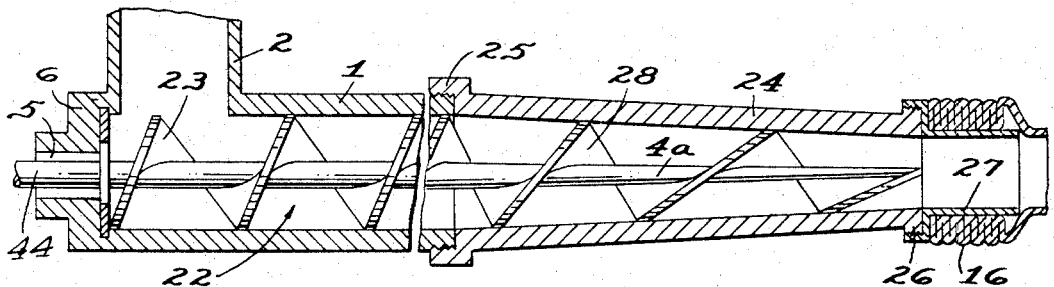
FIG. 5
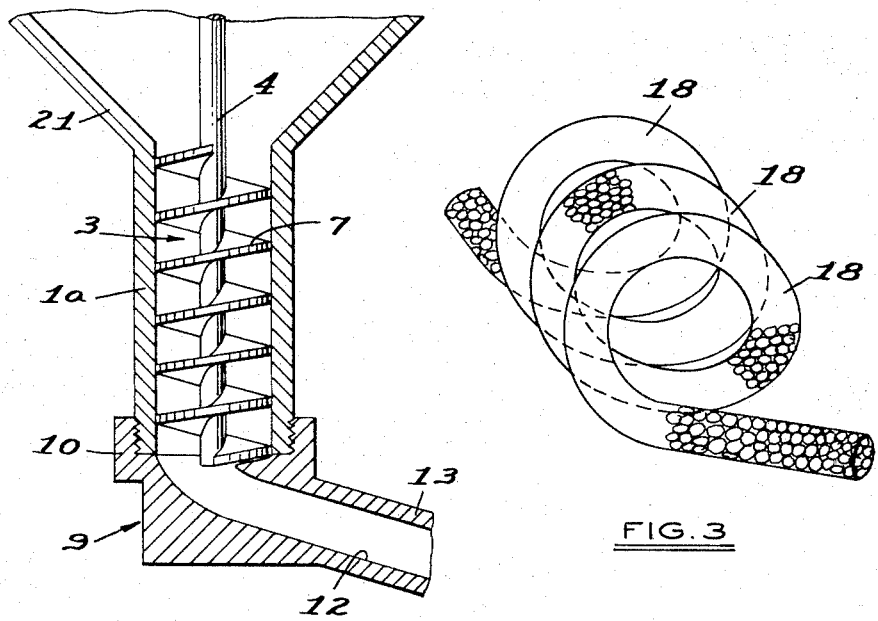
FIG. 4
FIG. 3
INVENTOR
ROBERT C. LUGIEWICZ
BY
Learman & McCulloch
ATTORNEYS

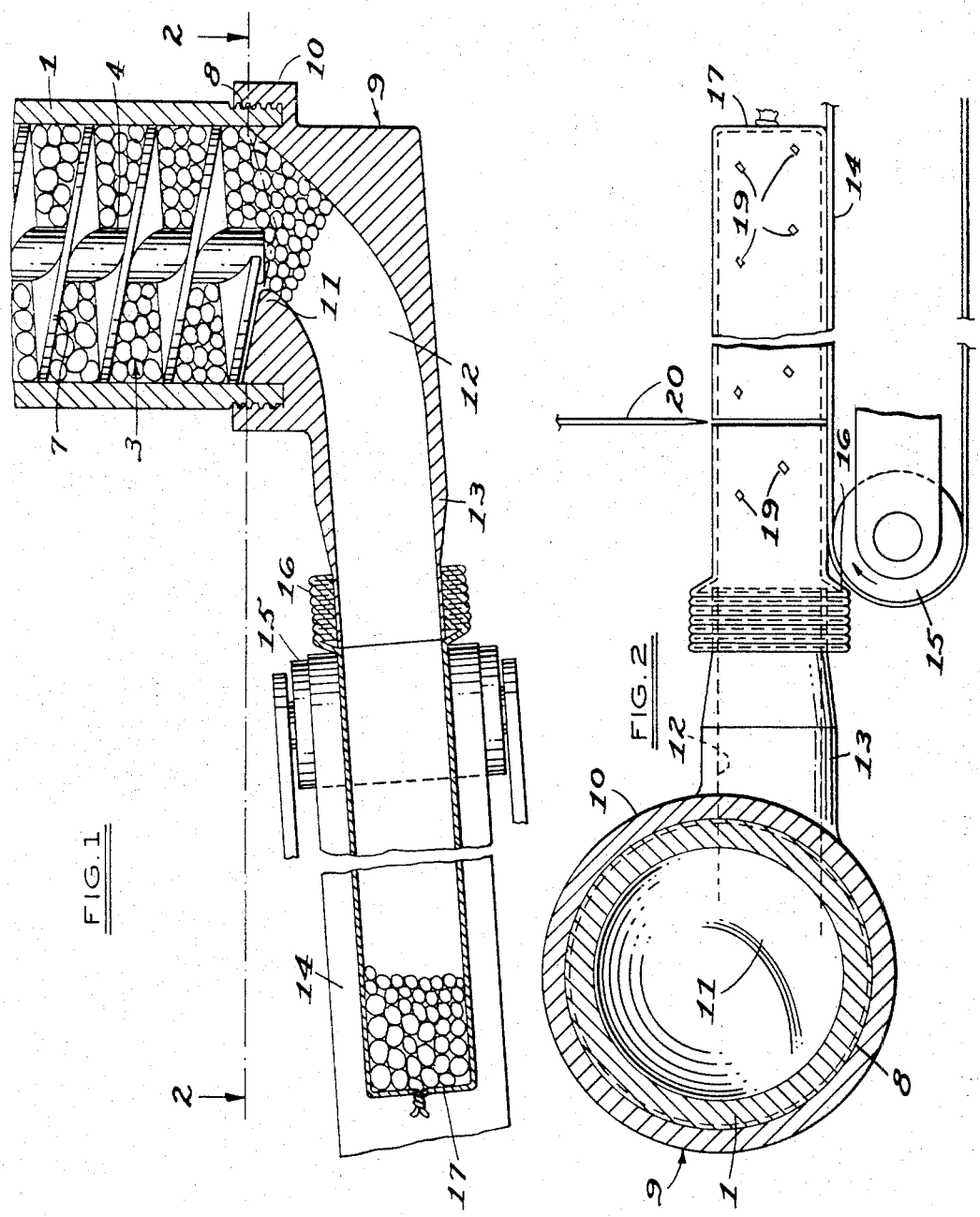

United States Patent Office 3,414,936
Patented Dec. 10, 1968

3,414,936
METHODS AND APPARATUS FOR PROCESSING MEAT OR THE LIKE
Robert C. Lugiewicz, Saginaw, Mich., assignor to Cubb-Pac Corporation, Pittsburgh, Pa., a corporation of Delaware
Filed Feb. 10, 1966, Ser. No. 526,412
11 Claims. (Cl. 17—40)

This invention relates to methods and apparatus for processing meat products and more particularly pertains to the encasing of pieces of boneless beef or the like in individual sticks or cylinders for shipment to and use by retailers.

Apparatus and methods of the general class to which the invention pertains are disclosed in Patent No. 3,316,104 and to which reference may be had for a more detailed description of the general considerations involved in products of this type.

An object of the invention is to provide apparatus and methods for packing discrete pieces of boneless beef or the like in a flexible casing and in which the generation of heat by the packing apparatus is substantially minimized.

Another object of the invention is to provide methods and apparatus of the character described and wherein the number of turns or bends which the pieces to be packed must negotiate is substantially reduced, thereby minimizing the risk of tearing or cutting the product, as well as reducing the pressure to which the product is subjected during the packaging process.

A further object of the invention is to provide apparatus for packaging meat pieces or the like and in which the pieces to be packaged are introduced to the package from a feeding device substantially along the line that the pieces normally would take as they leave the feeding device.

Another object of the invention is to provide methods and apparatus of the character described and which avoids the establishment of voids in the package.

Other objects and advantages of the invention will be pointed out specifically or will become apparent from the following description when it is considered in conjunction with the appended claims and the accompanying drawings, in which:

FIGURE 1 is a fragmentary view, partly in horizontal section and partly in top plan, of apparatus constructed in accordance with one embodiment of the invention;

FIGURE 2 is a sectional view taken along the line 2—2 of FIGURE 1;

FIGURE 3 is a perspective view diagrammatically illustrating the manner in which meat pieces are propelled through and discharged from the apparatus;

FIGURE 4 is a vertical sectional view of another embodiment of the invention; and FIGURE 5 is a longitudinal sectional view of another embodiment of the invention.

Apparatus constructed in accordance with the embodiment shown in FIGURES 1 and 2 comprises an elongated, tubular housing 1 having a cylindrical chamber closed at one end and open at its other end may be part of any one of a number of different kinds of so-called meat choppers or grinders. For example, the Model 4056 meat chopper manufactured by the Hobart Manufacturing Company and described in its bulletin No. S-69586, dated July 17, 1963, functions satisfactorily.

Secured to and in communication with the closed or receiving end of the housing 1 is an upstanding tubular column 2 (see FIGURE 5) at the upper end of which is a conventional tray or bowl (not shown). Pieces of boneless beef or the like may be introduced to the one end of the housing 1 via the column 2.

Journaled in the housing 1 is rotatable feeding means 3 comprising a shaft 4 journaled in bearings 5 mounted in a closure wall 6 at the receiving end of the housing 1. The shaft 4 may be coupled to an electric motor (not shown) or the like so as to be rotated thereby in the usual manner. The feeding means also includes a helical flight or vane 7 which is secured to the shaft 4 for rotation therewith and which has a uniform, predetermined pitch with respect to the longitudinal axis of the cylinder 1. The diameter of the vane 7 corresponds substantially to the inside diameter of the housing 1 with sufficient clearance to permit free rotation of the feeding means within the housing.

The axial length of the vane 7 corresponds substantially to the length of the housing 1 and terminates adjacent the discharge end of the latter. At its discharge end the housing 1 is exteriorly threaded as at 8 so as removably to accommodate a receiving head 9 having a mounting flange 10 that is threaded to correspond to the threads 8.

The head 9 at the flange 10 is annular in cross-section and includes an inlet 11 which tapers radially inwardly in a direction in axial prolongation of the housing 1 and merges smoothly into a discharge passage 12 formed in a tube 13 which extends substantially tangentially of the housing 1 and along a line that substantially parallels the pitch of the vane 7. That is, the axis of the passage 12 is offset from and inclined to the longitudinal axis of the housing 1 at an angle corresponding substantially to the pitch of the vane 7.

The taper of the inlet 11 is such that the cross-sectional area of the passage 12 corresponds substantially to one-half the cross-sectional area of the housing 1, less the cross-sectional area of the shaft 4. Stated differently, the cross-sectional area of the passage 12 should correspond substantially to one-half the cross-sectional area of the space between the shaft 4 and the interior wall of the housing 1.

The discharge passage 12 terminates in an open end which overlies one end of an endless conveyor belt 14 that is trained around driven rolls, one of which is shown at 15, which are driven in the direction of the arrow in FIGURE 2 by a suitable motor (not shown). A flexible, elongated casing 16 is adapted to be installed over the open end of the tube 13 and has one closed end 17 which initially is so located as to be quite close to the open end of the tube.

In the operation of the apparatus thus far described, discrete meat pieces are introduced to the receiving end of the housing 1 via the column 2 during rotation of the feeding means 3. The meat pieces are entrained and compacted by the vane 7 and are fed toward the discharge end of the housing 1 in the form of a solid, helical coil having parallel convolutions 18 (see FIGURE 3), the axial thickness of the coils 18 being determined by the spacing between adjacent convolutions of the vane 7. At the discharge end of the housing 1 the leading end of the coil of meat pieces emerges tangentially as a solid bar and is guided by the inlet 11 naturally into the passage 12 for discharge through the open end of the latter and into the casing 17. The taper of the inlet 11 prevents the formation of voids in the tube 13. As the bar of compacted meat pieces continues to be extruded or discharged from the tube 13, it enters the flexible casing 17 which is stripped off the tube. The thus encased meat is deposited on the conveyor 14 so as to be supported and carried away thereby.

Preferably, the casing 17 is provided with a plurality of openings 19 to avoid the entrapment of air in the casing. As the encased meat moves along the conveyor 14, it passes under a vertically reciprocable knife 20 which may be actuated periodically to slice through the encased meat and cut the latter into individual sticks or sections of predetermined length, following which the sticks may be frozen and stored or shipped, as is required.

The construction of the receiving tube 13 is such that the passage 12 not only is substantially tangential to the housing 1, but is inclined laterally of the latter so as to extend along a line which is substantially parallel to the pitch of the vane 7. That is, the passage 12 is substantially parallel to the plane of the convolutions of the meat coil. Meat discharged from the housing 1, therefore, leaves the latter without being subjected to any turning or bending forces. Accordingly, the pressure exerted on the meat pieces in the housing 1 by the vane 7 is maintained at a minimum. As a result, there will be minimum friction between the meat pieces, the vane, and the interior wall of the housing. Consequently the generation of heat by friction is minimal.

The apparatus disclosed in FIGURE 4 is substantially the same as has been described earlier, but differs from the latter in that the housing 1a is arranged vertically and is in direct communication with a hopper 21 from which meat pieces may be fed directly to the receiving end of the housing 1a. By means of this construction, the meat pieces are not required to negotiate any turns at the receiving end of the housing. The same receiving head 9 earlier described in connection with the embodiment shown in FIGURES 1 and 2 may be used with the embodiment shown in FIGURE 4.

The embodiments of the invention shown in FIGURES 1–4 utilize feeding means 3 in which the pitch of the vane 7 is uniform from end to end. In the embodiment of the invention shown in FIGURE 5, the housing 1 is the same as that shown in FIGURE 1. A rotatable feeding means 22 is journaled in the housing and comprises a shaft 44 on which is secured a substantially helical flight or vane 23 the pitch of which is uniform to the free end of the housing 1. A tubular housing extension 24 is mounted at the free end of the housing 1 by means of an annular flange 25 which abuts the free end of the housing 1 and is secured to the threaded end 8 of the latter. The housing member 24 tapers inwardly so as to form a substantially frustoconical tube terminating in a flange 26 to which is removably secured a cylindrical receiving sleeve 27 on which the casing 16 may be mounted. The cross-sectional area of the sleeve 27 corresponds substantially to one-half the cross-sectional area of the housing 1, less the cross-sectional area of the shaft 44.

The shaft 44 is provided with a tapered extension 4a which extends through the member 24. On the extension 4a is a helical flight or vane 28 the pitch of which constantly decreases toward the discharge end of the housing member 24, as a result of which the axial distance between adjacent convolutions increases. The increase in spacing between adjacent convolutions permits the extension 24 to accommodate, without binding, all meat introduced thereto from the housing 1.

The pitch of the vane 28 is such that, at the discharge end of the tube 24, the pitch of the vane substantially parallels the surface of the tube 24 and is as close as possible to being parallel to the axis of the sleeve 27. The pitch of the terminal end of the vane is exaggerated in the drawing for clarity. As a result, the leading end of the coil of meat is discharged into a passage which is inclined to the housing 1 along a line which parallels substantially the plane of the endmost convolution of the coiled meat.

The disclosed apparatus and methods are representative of presently preferred forms of apparatus and methods for producing meat sticks or cylinders, but as are intended to be illustrative rather than definitive of the invention. The invention is defined in the claims.

I claim:

1. Apparatus for packing discrete pieces of material comprising and elongated housing having a cylindrical chamber terminating in a discharge end; means for introducing pieces of material to said chamber; feeding means for moving material axially through said chamber toward said discharge end; and receiver means mounted on said housing at the discharge end of said chamber and having an elongated passage therein in communication with said chamber for receiving material discharged therefrom, said passage communicating with said chamber substantially tangentially thereof and extending laterally of the axis of said chamber, the axis of said passage being offset from the axis of said chamber.

2. The appparatus set forth in claim 1 wherein said feeding means comprises a rotatable shaft having a helical vane fixed thereto and extending through said chamber from one end thereof to the other.

3. The apparatus set forth in claim 2 wherein said passage extends laterally from the axis of said chamber along a line corresponding substantially to the pitch of said vane at the discharge end of said chamber.

4. The apparatus set forth in claim 3 wherein the pitch of said vane is substantially uniform from end to end thereof.

5. The apparatus set forth in claim 2 wherein said receiver means includes an inlet interconnecting said chamber and said passage, said inlet tapering in a direction away from said chamber.

6. The apparatus set forth in claim 5 wherein said inlet tapers only until the cross-sectional area thereof corresponds substantially to one half the cross-sectional area of said chamber less the cross-sectional area of said shaft.

7. The apparatus set forth in claim 1 including an elongated, flexible casing supported on said receiver means in a position to receive material discharged from said receiver, said casing having a plurality of openings therein spaced longitudinally of said casing.

8. The apparatus set forth in claim 7 wherein the cross-sectional area of said casing corresponds substantially to the cross-sectional area of said receiver means.

9. Apparatus for packing discrete pieces of meat comprising an elongated housing having a cylindrical chamber terminating in a discharge end; means for introducing pieces of meat to said chamber; feeding means for compacting meat pieces in said chamber into a coil and moving said coil axially of said chamber toward said discharge end; and receiver means mounted on said housing at the discharge end of said chamber and having an elongated passage therein, said passage having a cross-sectional area corresponding substantially to the cross-sectional area of a convolution of said coil, said receiver means having an inlet establishing communication between said passage and said chamber at the discharge end of the latter and tapering in a direction toward said passage an amount such as to reduce the cross-sectional area of said inlet from that corresponding substantially to the cross-sectional area of the discharge end of said chamber to that corresponding substantially to the cross-sectional area of said passage; and a flexible casing supported on said receiver means into which meat discharged from said receiver means may be received, said casing having a plurality of longitudinally spaced openings therein.

10. The apparatus set forth in claim 9 wherein said passage extends substantially tangentially of said chamber.

11. The apparatus set forth in claim 10 wherein said feeding means comprises a helical vane and wherein said passage extends laterally of said housing substantially parallel to the pitch of said vane.

References Cited

UNITED STATES PATENTS

| | | | |
|---|---|---|---|
| 475,367 | 5/1892 | Wasserman | 17—37 |
| 932,372 | 8/1909 | Brightbill | 17—37 |
| 2,837,762 | 6/1958 | Azzini et al. | 17—37 |
| 214,472 | 4/1879 | Teamer | 17—40 |
| 1,695,692 | 12/1928 | Kreisinger | 222—413 X |
| 2,260,320 | 10/1941 | Driscoll et al. | 222—413 |
| 3,093,271 | 6/1963 | Douglas | 222—413 |

FOREIGN PATENTS

| | | |
|---|---|---|
| 214,305 | 3/1961 | Austria. |
| 549,927 | 5/1932 | Germany. |

LUCIE H. LAUDENSLAGER, *Primary Examiner.*

U.S. Cl. X.R.

17—35, 41; 99—107, 109